United States Patent [19]

Shimizu et al.

[11] Patent Number: 5,264,505
[45] Date of Patent: Nov. 23, 1993

[54] POLYMER SCALE PREVENTIVE AGENT, POLYMERIZATION VESSEL FOR PREVENTING POLYMER SCALE DEPOSITION, AND PROCESS OF PRODUCING POLYMER USING SAID VESSEL

[75] Inventors: Toshihide Shimizu, Urayasu; Minoru Shigemitsu, Kamisu, both of Japan

[73] Assignee: Shin-Etsu Chemical Co., Ltd., Tokyo, Japan

[21] Appl. No.: 875,832

[22] Filed: Apr. 30, 1992

[30] Foreign Application Priority Data

Apr. 30, 1991 [JP] Japan .................. 3-126813

[51] Int. Cl.$^5$ ............................... C08F 2/00
[52] U.S. Cl. ........................ 526/62; 528/125
[58] Field of Search ................ 526/62; 528/125

[56] References Cited

U.S. PATENT DOCUMENTS 3,953,212  4/1976  Miyano et al. ............... 430/157
4,320,215  3/1982  Yonezawa et al. ............ 526/62

Primary Examiner—Joseph L. Schofer
Assistant Examiner—David Wu
Attorney, Agent, or Firm—Oblon, Spivak, McClelland, Maier & Neustadt

[57] ABSTRACT

A polymer scale preventive agent for use in polymerization of a monomer having an ethylenically unsaturated double bond, comprising a pyrogallol-acetone resin. The agent is used for forming a coating on the inner wall, etc. of a polymerization vessel. Deposition of polymer scale can be effectively prevented, and polymeric product with high whiteness is obtained.

13 Claims, No Drawings

POLYMER SCALE PREVENTIVE AGENT, POLYMERIZATION VESSEL FOR PREVENTING POLYMER SCALE DEPOSITION, AND PROCESS OF PRODUCING POLYMER USING SAID VESSEL

BACKGROUND OF THE INVENTION

1. Field of the Invention

The present invention relates to a polymer scale preventive agent useful in polymerization of a monomer having an ethylenically unsaturated double bond, a polymerization vessel for preventing polymer scale deposition, and a process of producing polymer using said vessel.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface and so forth of a polymerization vessel in polymerization of a monomer having an ethylenically unsaturated double bond, methods in which substances exemplified below are coated on the inner wall surface, etc. as a scale preventive agent, have been known.

For example, particular polar organic compounds (Japanese Patent Publication (KOKOKU) No.45-30343(1970)), a dye or pigment (Japanese Patent Publication (KOKOKU) No.45-30835(1970), an aromatic amine compound (Japanese Pre-examination Patent Publication (KOKAI) No.51-50887(1976)) and a reaction product of a phenolic compound and an aromatic aldehyde (Japanese Pre-examination Patent Publication (KOKAI) No.55-54317(1980)) are disclosed.

In the meantime, vinyl chloride polymers obtained by polymerization are required to have a good whiteness. That is, when polymeric products such as vinyl chloride polymers are formed or molded with no addition of a coloring agent, the resulting formed or molded product is colored more or less. This coloration is called initial coloration, which is required to be as low as possible. Specifically, for example, the formed or molded products are required to have an L value according to the Hunter's color difference equation, which is described in JIS Z 8730 (1980), of 70 or more.

The prior art polymer scale preventive agents generally include a great number of colored substances as exemplified typically by the dyes and pigments described in Japanese Patent Publication (KOKOKU) Nos.45-30835(1970) and 52-24953(1977), the aromatic amine compounds described in Japanese Pre-examination Patent Publication (KOKAI) No.51-50887(1976), and the reaction products of a phenolic compound and an aromatic aldehyde described in Japanese Pre-examination Patent Publication (KOKAI) No.55-54317(1980). Presumably, for this, a colored polymer is obtained in suspension polymerization and the like of vinyl chloride, etc. in a polymerization vessel which has a coating comprising the polymer scale preventive agent described above formed on its inner wall. That is, according to measurement of the lightness L described above, the L may be measured to be 65 or less, and coloration is thereby confirmed. Presumably, the coloration is caused by incorporation of components of the coating which has dissolved or peeled into the polymerization mass. Improvement is required for producing a polymer of high quality.

Moreover, the prior art polymer scale preventive agents generally include poisonous substances as exemplified typically by terrible substances such as aniline, nitrobenzene, formaldehyde, etc. among the polar compounds described in the above-mentioned Japanese Patent Publication (KOKOKU) No.45-30343(1970), and pigments containing a heavy metal such as chromium or lead among the pigments described in Japanese Patent Publication (KOKOKU) No.45-30835(1970). The dyes described in Japanese Patent Publication (KOKOKU) Nos.45-30835(1970) and 52-24953(1977) include some dyes that involve concern about carcinogenesis. Therefore, use of these substances may cause problems in safety of operators.

SUMMARY OF THE INVENTION

An object of the present invention is to provide a polymer scale preventive agent which is capable of preventing polymer scale deposition effectively, puts no color to polymeric product to thereby produce the polymers with high whiteness, and are not poisonous and therefore causes no concern with respect to safety or sanitation, a polymerization vessel capable of preventing polymer scale deposition using the same preventive agent, and a process of producing a polymer using the polymerization vessel.

Thus, the present invention provides, as a means of attaining said object, a polymer scale preventive agent for use in polymerization of a monomer having an ethylenically unsaturated double bond, comprising a pyrogallol-acetone resin.

Further the present invention provides a polymerization vessel having on its inner wall surfaces a coating preventing deposition of polymer scale, wherein said coating comprises a pyrogallol-acetone resin.

Furthermore, the present invention provides a process of producing a polymer by polymerization of a monomer having an ethylenically unsaturated double bond in a polymerization vessel, comprising the step of carrying out said polymerization in said polymerization vessel having on its inner surfaces the coating comprising a pyrogallol-acetone resin, whereby the deposition of polymer scale is prevented.

According to the present invention, high whiteness polymers with an L value of 70 or more can be prepared. Moreover, the scale preventive agent used in the present invention is not poisonous and is highly safe; hence there is no problem about safety or sanitation of operators.

Further, according to the present invention, polymer scale deposition can be effectively prevented, irrespectively of polymerization conditions such as the kind of a monomer or a polymerization initiator, polymerization type, the kind of material constituting the inner wall of polymerization vessels, etc. That is, deposition of polymer scale can be effectively prevented in polymerizations in which polymer scale deposition has been difficult to prevent, e.g., in emulsion polymerization, polymerizations using a polymerization vessel made of stainless steel, or polymerizations using a polymerization initiator with a strong oxidative effect such as potassium peroxodisulfate and the like.

Therefore, if polymerization is carried out under application of the present invention, the operation of removing polymer scale is not necessarily conducted every polymerization run, thereby productivity being improved.

DETAILED DESCRIPTION OF PREFERRED EMBODIMENTS

Polyer Scale Preventive Agent Pyrogallol-acetone Resin

The pyrogallol-acetone resin used in the present invention is a condensed polymer of pyrogallol and acetone. In the resin, the pyrogallol/acetone molar ratio normally ranges from 1/0.1 to 1/10, and the resin normally has a melting point of 100° to 500° C. The higher the melting point, the larger the molecular weight. For example, a melting point in the range of 160° to 170° C. corresponds to a molecular weight ranging from 1,450 to 1,650; a melting point in the range of 200° to 220° C. corresponds to a molecular weight ranging 2,600 to 4,000.

A pyrogallol-acetone resin is prepared by dissolving pyrogallol in acetone and condensing them in the presence of a condensation catalyst. In the preparation, pyrogallol is normally used in an amount of 1 to 100 parts by weight per 100 parts by weight of acetone. The condensation catalyst to be used includes, for example, phosphorus oxychlorides. The condensation reaction may be conducted at a temperature of room temperature to 100° C. Pyrogallolacetone resins are commercially available from Fuji Chemical Co.

To the scale preventive agent, for example, a cationic surfactant, a nonionic surfactant, an anionic surfactant, and the like can be added as long as the scale preventing effect is not impaired.

Further, inorganic compounds can be added to the agent as long as the high whiteness, non-poisonnousness or the scale preventing effect is not impaired. The inorganic compounds which may be added include, for example, silicic acids or silicates such as orthosilicic acid, metasilicic acid, mesodisilicic acid, mesotrisilicic acid, mesotetrasilicic acid, sodium metasilicate, sodium orthosilicate, sodium disilicate, sodium tetrasilicate and water glass; metallic salts such as oxygen acid salts, acetates, nitrates, hydroxides or halides of a metal selected from alkali earth metals such as magnesium, calcium, strontium and barium, zinc family metals such as zinc, aluminum family metals such as aluminum, and platinum family metals such as ruthenium, rhodium, palladium, osmium, iridium and platinum; and inorganic colloids such as ferric hydroxide colloid, colloidal silica, colloid of barium sulfate, and colloid of aluminum hydroxide. The above-mentioned inorganic colloids may be those prepared, for example, by mechanical crushing, irradiation with ultrasonic wave, electrical dispersion or chemical methods.

The polymer scale preventive agent is used for forming a coating on the inner wall surfaces, and preferably the surfaces of parts with which monomer comes into contact during polymerization, e.g., a stirring shaft, stirring blades, baffles, search coils, etc. of a polymerization vessel, so that scale deposition in the vessel can be prevented. Normally, in forming said coating on the inner wall surfaces, etc. of a polymerization vessel, the polymer scale preventive agent is used in a liquid state, i.e., as a coating liquid.

Preparation of a Coating Liquid

The concentration of the pyrogallol-acetone resin is not limited as long as the coating weight described later can be obtained, and it is normally in the range from 0.001 to 15% by weight.

The solvents used for preparation of the coating liquid include, for example, water; alcohols such as methanol, ethanol, propanol, butanol, 2-butanol, 2-methyl-1-propanol, 2-methyl-2-propanol, 3-methyl-1-butanol, 2-methyl-2-butanol, 2-pentanol, etc.; ketones such as acetone, methyl ethyl ketone, methyl isobutyl ketone, etc.; esters such as methyl formate, ethyl formate, methyl acetate, methyl acetoacetate, etc.; ethers such as 4-methyldioxolane, ethylene glycol diethyl ether, etc.; furans; and aprotic solvents such as dimethylformamide, dimethyl sulfoxide, acetonitrile, etc. These solvents may be used singly or as a mixed solvent of two or more thereof as appropriate.

Formation of Coating

When the coating liquid prepared as described above is used for forming a coating on the inner wall surface of a polymerization vessel, first, the coating liquid is applied to the inner wall surface and then dried sufficiently, followed by washing with water if necessary.

The above-mentioned coating is preferably formed on not only the inner wall surfaces of a polymerization vessel but also other parts with which the monomer comes into contact during polymerization. For example, it is preferred to form the coating by applying said coating liquid on a stirring shaft, stirring blades, condensers, headers, search coil, bolts, nuts, etc.

More preferably, the coating is formed on not only the parts with which the monomer comes into contact during polymerization but also other parts on which polymer scale may deposit, for example, such as the inner surfaces of equipment and tubes of recovery system for unreacted monomer. These parts, more specifically, are exemplified by the inner wall surfaces of monomer distillation columns, condensers, monomer stock tanks and valves, etc. in said recovery system.

The method of applying the coating liquid on the inner wall surface, etc. of a polymerization vessel is not particularly limited, and includes, for example, the brush coating, spray coating, the method of filing the polymerization vessel, etc. with the coating liquid followed by withdrawal thereof, and automatic coating methods as disclosed in Japanese Pre-examination Patent Publication (KOKAI) Nos.57-61001(1982) and 55-36288(1980), and Japanese Patent Publication (KOHYO) Nos.56-501116(1981) and 56-501117(1981), and Japanese Pre-examination Publication (KOKAI) No.59-11303(1984), etc.

The method of drying wet coated surface provided by application of the coating liquid, is not limited, either. The drying is conducted preferably at a temperature within the range from room temperature to 100° C. Specifically, a method in which, after the liquid is applied, hot air with a suitable elevated temperature is blown to the coated surface, and a method in which the inner wall surface of a polymerization vessel and the surfaces of other parts to be coated are previously heated at, e.g., 30°–80° C. and the coating liquid is directly applied to the heated surfaces, etc. After dried, the coated surfaces are washed with water if necessary.

The coating thus formed has normally a coating weight of 0.001 g/m² or more, preferably from 0.05 to 2 g/m².

The above coating operation may be conducted every 1 to ten-odd batches of polymerization. The formed coating has fairly good durability and retains the polymer scale-preventing action; therefore the coating operation is not necessarily performed for every batch of polymerization. Hence, the productivity of the manufactured polymer is improved.

Addition to Polymerization System

The polymer scale preventive agent of the present invention may be added into a polymerization medium in addition to the formation of the coating, so that the scale preventing effect can be expected. The scale preventive agent is normally added in a liquid state like the coating liquid described above. The amount of the polymer scale preventive agent to be added into the polymerization medium, preferably ranges from about 10 ppm to 1,000 ppm based on the whole weight of the monomer charged. The addition should be conducted so that it may not adversely affect the quality of polymeric product to be obtained with respect to fish eyes, bulk density, particle size distribution, etc.

Polymerization

After forming the coating on the inner wall surfaces of a polymerization vessel and other parts with which monomer may come into contact by application of the coating liquid, polymerization is carried out in accordance with conventional procedures therein. That is, a monomer having an ethylenically unsaturated double bond and optionally other materials such as a polymerization medium and a dispersing agent, followed by carrying out polymerization according to conventional methods.

The monomer having an ethylenically unsaturated double bond to which the method of this invention can be applied includes, for example, vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; and diene monomers such as butadiene, chloroprene and isoprene; aromatic vinyl compounds such as styrene; acrylonitrile, halogenated vinylidenes, and vinyl ethers.

There are no particular limitations on the type of polymerization to which this invention can be applied. The present invention is effective in any types of polymerization such as suspension polymerization, emulsion polymerization, solution polymerization, bulk polymerization, and gas phase polymerization. Particularly, the present invention is suitable to polymerizations in an aqueous medium such as suspension or emulsion polymerization.

Specifically, in the case of suspension polymerization and emulsion polymerization, polymerization is generally performed as follows, for instance.

First, water and a dispersing agent are charged into a polymerization vessel, and thereafter a polymerization initiator is charged. Subsequently, the inside of the polymerization vessel is evacuated to a pressure of from about 0.1 to about 760 mmHg, and a monomer is then charged (whereupon the pressure inside the polymerization vessel usually becomes from 0.5 to 30 kgf/cm².G). Then, the polymerization is normally carried out at a temperature of from 30° to 150° C. During the polymerization, one or more of water, a dispersing agent and a polymerization initiator may be added, if necessary. Suitable reaction temperature during the polymerization is different depending on the kind of monomer to be polymerized. For example, in the case of polymerizing vinyl chloride, polymerization may be carried out at 30° to 80° C.; in the case of polymerizing styrene, polymerization may be carried out at 50° to 150° C. The polymerization may be judged to be completed when the pressure inside the polymerization vessel falls to from about 0 to 7 kgf/cm².G or when cooling water which passes through a jacket provided around the polymerization vessel indicates almost the same temperature at the inlet where it is charged and at the outlet where it is discharged (i.e., when liberation of heat due to polymerization reaction has been completed). The water, dispersing agent and polymerization initiator for the polymerization are charged in amounts of about 100 to 500 parts by weight, about 0.01 to 30 parts by weight, and about 0.01 to 5 parts by weight, respectively, per 100 parts by weight of the monomer.

In the case of solution polymerization, an organic solution such as toluene, xylene, pyridine and the like is used as a polymerization medium in place of water. The dispersing agent is optionally used. The other conditions are generally the same as those described for suspension and emulsion polymerization.

In the case of bulk polymerization, after the inside of a polymerization vessel is evacuated to a pressure of from about 0.01 mmHg to about 760 mmHg, a monomer and a polymerization initiator are charged, and then polymerization is carried out at a temperature of from −10° C. to 250° C. For example, in polymerizing vinyl chloride, polymerization is carried out at a temperature of from 30° C. to 80° C.; and in polymerizing styrene, polymerization may be carried out at 50° C. to 150° C.

The present invention is effective in preventing polymer scale from depositing, independent of materials constituting the inner wall, etc. of a polymerization vessel. For example, this method is effective in preventing polymer scale from depositing in polymerization vessels made of a stainless steel or other steels or vessels internally lined with glass.

Any additive materials that have been added in a polymerization system can be used without any limitation. More specifically, this invention can effectively prevent polymer scale from depositing, even in polymerization systems containing the following additives: for example, polymerization initiators such as t-butyl peroxyneodecanoate, bis(2-ethylhexyl) peroxydicarbonate, (3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, αα'-azobisisobutyronitrile, α,α'-azobis-2,4-dimethylvaleronitrile, potassium peroxodisulfate, ammonium peroxodisulfate, p-methane hydroperoxide; suspension agents acids, vinyl acetate/maleic anhydride copolymers, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as trichloroethylene and mercaptans as exemplified by t-dodecyl mercaptans; and pH adjusters.

EXAMPLES

The present invention is now described in detail by way of working examples and comparative examples. In each of tables below, Experiments of Nos. marked with * are comparative examples, and the other Experiments working examples of the present invention.

EXAMPLE 1

Polymerization was carried out in the following manner using a polymerization vessel with an inner capacity of 1,000 liters and having a stirrer.

In each experiment, first, a pyrogallol-acetone resin was dissolved in a solvent so that the concentration thereof might become the value given in Table 1, to prepare a coating liquid. The coating liquid was applied to the inner wall and other parts with which a monomer comes into contact including the stirring shaft, stirring blades and baffles, followed by drying under heating at 60° C. for 15 min. to form a coating, which was then washed with water.

Experiment of No. 101 is a comparative example in which no coating liquid was applied.

Subsequently, in the polymerization vessel in which a coating had been formed as above, were charged 400 kg of water, 200 kg of vinyl chloride, 250 g of a partially saponified polyvinyl alcohol, 25 g of hydroxypropylmethyl cellulose and 75 g of diisopropyl peroxydicarbonate. Then, polymerization was carried out at 57° C. with stirring for 6 hours. After the completion of the polymerization, the amount of polymer scale depositing on the inner wall of the polymerization vessel and the whiteness or initial coloration of the polymer obtained were measured according to the following.

Measurement of the Amount of Polymer Scale Deposition

The scale depositing on the inner wall surface in an area of 10 cm square were scraped off with a stainless steel spatula as completely as possible to be confirmed with naked eyes, and then the scraped scale was weighted on a balance. Thereafter, the amount of the deposited scale per area of 1 $m^2$ was obtained by multiplying the measured value by 100.

Measurement of Initial Coloration of Polymer

A hundred parts by weight of a polymer, one part by weight of a tin laurate stabilizing agent (trade name: TS-101, product of Akishima Chemical Co.) and 0.5 part by weight of a cadmium stabilizing agent (trade name: C-100J, product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm ×4 cm ×1.5 cm (thickness), and molded under heating at 160° C. and under a pressure of 65 to 70 kgf/$cm^2$ to prepare a test specimen. This test specimen was measured for luminosity index L in the Hunter's color difference equation described in JIS Z 8730 (1980). Initial coloration is evaluated to be more favorable with increase in L value.

The L value was determined as follows.

The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 was adopted. Next, L was calculated based on the equation: L=10Y½described in JIS Z 8730(1980).

The results are given in Table 1.

TABLE 1

| | Coating liquid | | | | |
|---|---|---|---|---|---|
| Exp. No. | Melting point of Pyrogallol-acetone resin used | concentration (wt. %) | Solvent | Amount of scale (g/$m^2$) | L |
| 101* | — | — | — | 1,300 | 73 |
| 102 | 160–170° C. | 0.05 | Methanol | 15 | 73 |
| 103 | 160–170° C. | 0.1 | Methanol | 13 | 73 |
| 104 | 160–170° C. | 0.5 | Methanol | 10 | 73 |
| 105 | 200–220° C. | 0.05 | Acetone | 8 | 73 |
| 106 | 200–220° C. | 0.1 | Acetone | 7 | 73 |
| 107 | 200–220° C. | 0.5 | Acetone | 5 | 73 |

EXAMPLE 2

In each experiment, the coating procedure of Example 1 was repeated for a stainless steel polymerization vessel having an inner capacity of 20 liters and equipped with a stirrer to form coatings on the inner wall, etc. of the vessel, except that a pyrogallol-acetone resin was dissolved in a solvent in accordance with the conditions given in Table 2 to prepare a coating liquid.

In the polymerization vessel in which the coating was thus formed, were charged 9 kg of water, 225 g of sodium dodecylbenzenesulfonate, 12 g of t-dodecyl mercaptan, and 13 g of potassium peroxodisulfate. After the inner atmosphere was replaced with a nitrogen gas, 1.3 kg of styrene and 3.8 kg of butadiene were charged, followed by polymerization at 50° C. for 20 hours.

After completion of the polymerization, the amount of polymer scale depositing on the inner wall surface was measured in the same manner as in Example 1. The results are given in Table 2.

TABLE 2

| | Coating liquid | | | |
|---|---|---|---|---|
| Exp. No. | Melting point of Pyrogallolacetone resin used | concentration (wt. %) | Solvent (wt. ratio) | Amount of scale (g/$m^2$) |
| 201* | — | — | — | 400 |
| 202 | 160–170° C. | 0.1 | Methanol | 15 |
| 203 | 200–220° C. | 0.3 | Acetone | 12 |

We claim:

1. A polymer scale preventive agent for use in polymerization of a monomer having an ethylenically unsaturated double bond consisting of a condensed polymer of pyrogallol and acetone, and a solvent selected from the group consisting of alcohols, esters, ethers, furans, dimethylformamide, dimethylsulfoxide, acetonitrile and $C_{4-6}$ ketones.

2. The polymer scale preventive agent according to claim 1, wherein said condensed polymer has a melting point of 100° to 500° C.

3. The polymer scale preventive agent according to claim 1, wherein the concentration of said condensed polymer is in the range of from 0.001 to 15% by weight.

4. The polymer scale preventive agent according to claim 1, wherein said condensed polymer comprises a pyrogallol/acetone molar ratio of from 1/0.1 to 1/10.

5. The polymer scale preventive agent of claim 1, wherein said condensed polymer is prepared by condensing pyrogallol and acetone in the presence of a condensation catalyst.

6. The polymer scale preventive agent of claim 5, wherein said condensation catalyst is a phosphorous oxychloride.

7. The polymer scale preventive agent of claim 1, wherein said solvent is selected from the group consisting of $C_{1-5}$ alcohols, $C_{4-6}$ ketones, $C_{2-5}$ esters and $C_{4-6}$ ethers.

8. A polymer scale preventive agent for use in polymerization of a monomer having an ethylenically unsaturated double bond, consisting of a condensed polymer of pyrogallol and acetone, a solvent selected from the group consisting of alcohols, esters, ethers, furans, di-methyl-formamide, dimethylsulfoxide, acetonitrile and $C_{4-6}$ ketones and a surfactant in an amount which does not prevent the scale preventing effect of said polymer scale preventive agent.

9. A polymer scale preventive agent for use in polymerization of a monomer having an ethylenically unsaturated double bond, consisting of a condensed polymer of pyrogallol and acetone, a solvent selected from the group consisting of alcohols, esters, ethers, furans, di-methyl-formamide, dimethylsulfixide, acetonitrile and $C_{4-6}$ ketones and an inorganic compound in an amount which does not prevent the scale preventing effect of aid polymer scale preventive agent.

10. The polymer scale preventive agent of claim 9, wherein said inorganic compound is selected from the group consisting of silicic acids, silicates, metallic salts and inorgaic colloids.

11. The polymer scale preventive agent of claim 9, wherein said inorganic compound is selected from the group consisting of orthosilicic acid, metaslicic acid, mesodisilicic acid, mesotrisilicic acid, mesotetrosilicic acid, sodium metasilicate, sodium orthosilicate, sodium disilicate, sodium tetrasilicate and water glass.

12. The polymer scale preventive agent of claim 9, wherein said inorganic compound is an oxygen acid salt, acetate, nitrate, hydroxide or halide of an alkali earth metal, zinc family metal, aluminum family metal or platinum family metal.

13. The polymer scale preventive agent of claim 9, wherein said inorganic compound is selected from the group consisting of ferric hydroxide colloid, colloidal silica, colloidal barium sulfate and colloid of aluminum hydroxide.

* * * * *